US012723454B2

(12) United States Patent
Singh

(10) Patent No.: US 12,723,454 B2
(45) Date of Patent: Sep. 1, 2026

(54) ACTUATING ASSEMBLY FOR A DOOR ELEMENT DISPLACEABLY ACCOMMODATED IN A MOTOR VEHICLE

(71) Applicant: Kiekert AG, Heiligenhaus (DE)

(72) Inventor: Rajeev Kumar Singh, Dublin, OH (US)

(73) Assignee: Kiekert AG, Heiligenhaus (DE)

( * ) Notice: Subject to any disclaimer, the term of this patent is extended or adjusted under 35 U.S.C. 154(b) by 143 days.

(21) Appl. No.: 18/669,654

(22) Filed: May 21, 2024

(65) Prior Publication Data

US 2025/0361760 A1 Nov. 27, 2025

(51) Int. Cl.
*E05F 5/00* (2017.01)
*E05B 83/40* (2014.01)

(52) U.S. Cl.
CPC ........... *E05F 5/003* (2013.01); *E05Y 2201/22* (2013.01); *E05Y 2201/244* (2013.01); *E05Y 2201/246* (2013.01); *E05Y 2900/531* (2013.01)

(58) Field of Classification Search
CPC .... Y10S 292/04; Y10S 292/25; Y10S 292/46; Y10T 292/1028; Y10T 292/1089; E05B 83/04; E05B 83/40; E05B 13/002; E05B 13/005; E05B 1/0038; E05B 1/0046; E05B 1/0092
See application file for complete search history.

(56) References Cited

U.S. PATENT DOCUMENTS 2,046,342 A * 7/1936 Muck .................... E05B 13/005 403/328
2,709,102 A * 5/1955 Phinney ................ E05B 1/0046 296/153
4,511,166 A * 4/1985 Weinerman ......... E05B 65/0811 292/29
5,234,237 A * 8/1993 Gergoe ................... E05B 83/40 292/201
5,836,639 A * 11/1998 Kleefeldt ................ E05B 81/76 49/213
5,901,590 A * 5/1999 Lai ...................... E05B 63/0065 70/210
5,921,612 A * 7/1999 Mizuki ................... E05B 81/25 292/341.16
5,979,949 A * 11/1999 Finkelstein ............. E05B 83/04 292/29
5,979,951 A * 11/1999 Shimura ................. E05B 85/26 292/216

(Continued)

FOREIGN PATENT DOCUMENTS

DE 4023822 A1 * 1/1992 ........... E05B 77/265
DE 19706393 A1 * 10/1997 .............. E05F 15/40

(Continued)

*Primary Examiner* — Carlos Lugo
(74) *Attorney, Agent, or Firm* — Renner, Otto, Boisselle & Sklar, LLP

(57) ABSTRACT

An actuating assembly for a door element displaceably accommodated in a motor vehicle includes a door lock, a door holding lock and a handle, wherein the door lock can be unlocked by actuating the handle in a first direction, and the door holding lock can be unlocked by actuating the handle in an opposite direction, and wherein the handle of the actuating assembly can be held for electrically actuating the door element.

14 Claims, 3 Drawing Sheets

(56) References Cited

U.S. PATENT DOCUMENTS

| | | | | | |
|---|---|---|---|---|---|
| 6,135,513 | A * | 10/2000 | Hamada | E05B 81/20 | 292/201 |
| 6,561,557 | B2 * | 5/2003 | Choi | E05B 83/40 | 292/216 |
| 6,722,714 | B2 * | 4/2004 | Ooe | E05B 83/36 | 292/216 |
| 7,100,951 | B2 * | 9/2006 | Jien | E05C 3/043 | 292/241 |
| 7,341,291 | B2 * | 3/2008 | Ooe | E05B 77/06 | 292/336.3 |
| 7,360,381 | B1 * | 4/2008 | Leite | E05C 3/042 | 70/210 |
| 7,438,331 | B2 * | 10/2008 | Wakatsuki | E05B 81/20 | 292/201 |
| 7,931,312 | B2 * | 4/2011 | Mochizuki | E05B 81/46 | 292/216 |
| 9,394,732 | B1 * | 7/2016 | Ahmad | E05B 1/0046 | |
| 10,435,925 | B2 * | 10/2019 | Park | E05B 53/003 | |
| 11,795,737 | B2 * | 10/2023 | Underwood | E05B 79/04 | |
| 11,945,288 | B2 * | 4/2024 | Choi | E05B 81/76 | |
| 2007/0194576 | A1 * | 8/2007 | Esposito | E05C 1/166 | 292/143 |
| 2021/0214976 | A1 | 7/2021 | Hiramoto et al. | | |
| 2023/0203856 | A1 * | 6/2023 | Singh | E05C 17/46 | 70/95 |

FOREIGN PATENT DOCUMENTS

| | | | | |
|---|---|---|---|---|
| DE | 102007054000 | A1 * | 5/2009 | E05B 83/40 |
| DE | 202008003845 | U1 * | 8/2009 | E05B 79/20 |
| DE | 102018126163 | A1 | 4/2020 | |
| DE | 102022210713 | A1 | 6/2023 | |

* cited by examiner

ACTUATING ASSEMBLY FOR A DOOR ELEMENT DISPLACEABLY ACCOMMODATED IN A MOTOR VEHICLE

FIELD OF DISCLOSURE

The invention relates to an actuating assembly for a door element displaceably accommodated in a motor vehicle, having a door lock, a door holding lock and a handle, wherein the door lock can be unlocked by actuating the handle in a first direction, and the door holding lock can be unlocked by actuating the handle in an opposite direction.

BACKGROUND OF DISCLOSURE

Door elements displaceably accommodated in a motor vehicle are primarily sliding doors. Sliding doors are used where, for example, side entry into a motor vehicle is to be enabled so that loading and/or entry into the motor vehicle is made possible. Sliding doors have the advantage that the sliding movement moves the door element along the motor vehicle so that only a small free space next to the motor vehicle is required to clear a large opening in the motor vehicle. In so doing, the large opening makes it easily possible to easily load and/or enter and exit, even in the rear rows of seats.

The door elements arranged displaceably on the motor vehicle must be held securely in the closed position during operation of the motor vehicle, just like any movable component arranged on the motor vehicle. For this purpose, motor vehicle locks or locking systems are used which are usually equipped with a locking mechanism and interact with a locking bolt or locking bolt bracket. The locking system or door lock can be positioned in the door element or also on the motor vehicle itself. Accordingly, the lock holder, locking bar or locking bolt can be positioned opposite the door lock on the motor vehicle, for example on a B-pillar or, for example, on the door element itself. The door lock holds the door element in the closed position, wherein the door lock is held in a main latched position, wherein the main latched position in the locking mechanism reflects the position of the door element in which the door element is completely closed. Door locks are generally known, and reference is made here solely by way of example to DE 10 2018 126 163 A1 which discloses a lock for a motor vehicle with a locking mechanism and the corresponding closing mechanism of rotary latch and pawl.

In order to be able to hold the sliding door securely even when the motor vehicle is at a standstill and in an open position of the door element, so-called "door holding locks" are used. Door holding locks can, for example, be mounted at an end of the sliding door opposite the door lock and also interact with a lock holder there. Less stringent requirements are placed on the door holding lock since the door holding locks only need to be able to hold the door element in the open position. This means that door holding locks can also be equipped with snap-in locking mechanisms, i.e. without pre-latching, for example. Consequently, if the door lock is opened and the sliding door is moved into the open position, the door holding lock engages in the lock holder, wherein the locking mechanism arranged in the door holding lock moves into a latched position. The door element is then held securely in the open position.

An actuating assembly or an actuating system for actuating two locks of a displaceably arranged door element is described in DE 10 2022 210 713 A1. The actuating assembly comprises a door lock, a door holding lock and a handle, wherein the door lock can be unlocked by actuating the handle in a first direction, and the door holding lock can be unlocked by actuating the handle in an opposite direction. In this respect, the publication describes a mechanism with which both the opening of the door lock and the unlocking of the door holding lock can be made possible by means of a handle. It has proven to be advantageous that the door lock can be actuated or unlocked by a first movement of the handle, whereas the door holding lock can be released by an opposite movement of the handle. In one exemplary embodiment, the handle interacts with a deflection lever, wherein the deflection lever displaces an actuating bolt, and the actuating bolt triggers an electrical signal in the door lock so that the door lock can be unlocked. If the door element is in the open and secured position, an unlocking or actuating lever can be moved by an opposite movement of the handle, which then unlocks the door holding lock by means of a Bowden cable.

The known prior art has proven itself in principle, but reaches its limits when, for example, electrically actuated door elements are used in a model series of a motor vehicle, on the one hand, and manual operation of the door element is desired, on the other hand. This is where the invention starts from.

SUMMARY OF DISCLOSURE

The object of the invention is to provide an actuating assembly for a door element arranged displaceably on the motor vehicle, with which both manual actuation as well as electrical actuation of the door element are possible. Furthermore, it is the object of the invention to realize the improvement of the prior art with the simplest constructive means and at low cost.

The object is achieved in terms of device engineering by the features herein. Advantageous embodiments of the invention are specified herein. It should be noted that the embodiments described below are not limiting; rather, any possible variations of the features described in the description are possible. In terms of method engineering, the object of the invention is achieved by the features herein.

According to the description herein, the object of the invention is achieved by providing an actuating assembly for a door element displaceably accommodated in a motor vehicle, having a door lock, a door holding lock and a handle, wherein the door lock can be unlocked by actuating the handle in a first direction, and the door holding lock can be unlocked by actuating the handle in an opposite direction, and wherein the handle of the actuating assembly can be held for electrically actuating the door element. The structure of the actuating assembly or actuating system according to the invention now makes it possible to use the actuating assembly for manual as well as electrically assisted operation of the displaceably arranged door element. On the one hand, the assembly is able to manually unlock the locking systems or the door lock and the door holding lock and thus ensure manual operation, and on the other hand, by holding the handle, the displaceably arranged door element with an electric lock and an electrically driven sliding door can be used. Therefore, the actuating assembly can be used independently of the outfitting of the motor vehicle so that the manufacturer is provided with a system that can be used for both applications. In addition, it is also possible to release the hold of the handle and provide mechanical operation of the door element in the event of failure of an electric drive of the door element, as explained below.

As introduced at the beginning, the door lock refers to the locking of the door element in the closed position, whereas the door holding lock is used to fix the door element in the open position. The handle is preferably a plastic part or a hybrid component consisting of a metal part and a plastic part. The handle is movably accommodated in the actuating assembly and is preferably displaceably mounted in the actuating assembly. To this end, for example, guide rails can be arranged in a housing of the actuating assembly in which the handle is accommodated in a displaceably mounted manner.

The handle of the actuating assembly can be held and preferably fixed in position by means of a marking mechanism in the actuating assembly. To actuate the door lock, for example, the handle can be moved linearly in a first direction, for example, towards the rear of the motor vehicle and towards the front of the vehicle to actuate the door holding lock. In the initial position, the handle thus assumes a central position from which the handle can be displaced in one direction by 30 mm, preferably 20 mm and even more preferably by 10 mm. In this case, the blocking mechanism enables the movement of the handle to be preventable. Thus, the blocking device has the ability to prevent movement of the handle.

Preferably and in a further embodiment variant of the invention, the blocking mechanism comprises at least one blocking pin, in particular a blocking pin arranged in a linearly displaceable manner. The blocking pin is accommodated in the B actuating assembly in such a way that a preferably linear movement of the blocking pin enables the blocking pin to block the handle and, in particular, the handle in the region of the linear guide. For this purpose, the blocking pin can be moved linearly and preferably at right angles to the linear movement of the handle and engage with the handle and the housing or the linear guide. Therefore, the blocking mechanism and in particular the blocking pin can fix the handle by actuating the blocking pin.

In one embodiment variant of the invention, the blocking pin can be positioned by means of a sliding guide, in particular by means of a sliding guide with a spring element. The blocking pin can be moved in the direction of the handle and is held in the pressed-in position by means of the sliding guide, as used for retractable pins, for example. Therefore, the sliding guide enables the locking pin to be held in the blocking position. A spring element can apply the necessary compressive force to hold the locking pin in the sliding guide. After once again pressing the blocking pin, the blocking pin can be moved out of the blocking position and returned to the initial position in which the handle can move freely. The sliding guide in combination with the spring element thus enables two different positions of the locking pin. A first initial position and a second blocking position.

In addition, the blocking mechanism can have at least one blocking latch, wherein the blocking latch can be actuated by means of the blocking pin. A movement of the blocking mechanism, and in particular movement of the blocking pin, enables a displacement into a blocking position. If at least one blocking latch is additionally arranged on the blocking pin, one, two or more points of engagement on the handle can be realized, which enables a more stable fixing of the handle. In addition to the blocking latch, it is also conceivable that, for example, an extension of the blocking latch is formed so that the blocking latch extends over a sub-region of the handle, wherein the extension then engages in the handle and, for example, in the housing or the guide rail in such a way as to prevent movement of the handle. In any event, the blocking mechanism enables the fixing of the handle so that the operator can grasp the handle, but the handle can be prevented from being displaced.

According to a further development of the invention, an actuating lever is provided for the door holding lock, wherein a locking device can also be provided for the actuating lever. As explained at the beginning, the actuating lever can also be designated as an unlocking lever for the door holding lock. A movement of the actuating lever unlocks the holding lock so that the door element can be released and the closing of the door element can be enabled. In order to prepare the door holding lock for electrical actuation of the door element in addition to fixing the handle, a locking device is provided which fixes the actuating or unlocking lever in a position in which the door holding lock is unlocked. In other words, the actuating lever is deflected to such an extent that a release mechanism, for example a release lever assigned to the door holding lock, is actuated in such a way that a pawl in the door holding lock is held out of engagement with the rotary latch in the door holding lock. Although the door holding lock can move into a lock holder with the deflected pawl, the locking mechanism cannot be engage in the door holding lock due to the deflected pawl.

It has proven to be advantageous that the locking device comprises a locking pin, in particular a spring-loaded locking pin. The actuating lever is preferably pivotally accommodated in the actuating assembly so that in manual operation of the door element, the handle is able to pivot the actuating lever and thus actuate a Bowden cable, for example, which then unlocks the spaced-apart door holding lock. By means of the locking device, the actuating lever can be deflected and fixed in such a way that, as described above, a snapping in of the locking mechanism can be prevented in the door holding lock. If a locking pin now interacts with the actuating lever, the locking pin can engage with the actuating lever by a manual pivoting of the actuating lever and block the movement of the actuating lever.

For this purpose, for example, the locking pin is deflected via a bevel on the locking pin in combination with a compression spring, and the locking pin engages in an opening or even behind the actuating lever so that the pivoting of the actuating lever can be prevented.

To manually pivot the actuating lever and thus deflect the actuating lever, the actuating lever can have an engagement means, for example in the form of a cylindrical extension which can be manually reached by the operator, just like the locking pin is manually reachable for the operator. The engagement means as well as the blocking pin can protrude from a door panel, for example. By depressing the blocking pin and manually pivoting the actuating lever, on the one hand, the handle can be fixed and, on the other hand, the door holding lock can be held in a release position, i.e. an unlocked position. The door element is then set for electromotive movement and opening and closing of the door element. Manual engagement in the actuating lever is possible in such a way that the pivoting of the actuating lever beyond an angle that is required to unlock the door holding lock is enabled; for example, a small angle of 15 degrees, preferably 20 degrees, is sufficient for unlocking, whereas an angle greater than 30 degrees can be provided for locking the actuating lever. Thus, the manual deflection of the actuating lever goes so far that the locking pin can engage in the actuating lever and fix it in position.

The locking pin itself can also protrude from a door panel, for example, and can be gripped by the operator. To unlock the actuating lever, the locking pin can then be gripped manually, and the actuating lever can be released. Even if it is mentioned here in this exemplary embodiment that the blocking pin, the actuating lever and the locking pin can be gripped manually and are visible, of course, a possibility is also conceivable with which the actuating means of the actuating assembly are concealed and only become visible to the operator, for example, after the removal of a door panel or a cover.

Due to the structure according to the invention and the convertibility of the actuating assembly from manual operation of the door element to an electric motor-assisted drive of the door element, it is possible to provide the actuating assembly for electrically actuated door elements and for manual operation. The conversion can also be advantageous if, for example, a motorized drive of the door element fails and manual operation becomes necessary.

In terms of method engineering, the object of the invention is achieved by providing a method for holding a handle, with which the handle can be held by actuating a blocking device, and with which the door holding lock can be unlocked by manually pivoting the actuating lever so that the handle can be fixed, and the door holding lock can be put out of operation. The method according to the invention is a simple method that can be easily described in an instruction manual in order to provide a manual operation of the door element along with an electric motor-assisted operation of the door element with an actuating assembly.

The invention is explained in more detail below with reference to the accompanying drawings. However, the principle applies that the embodiment does not limit the invention, but is merely an advantageous embodiment. The features shown can be implemented individually or in combination with further features of the description as well as the claims-individually or in combination.

DETAILED DESCRIPTION

Figure 1:
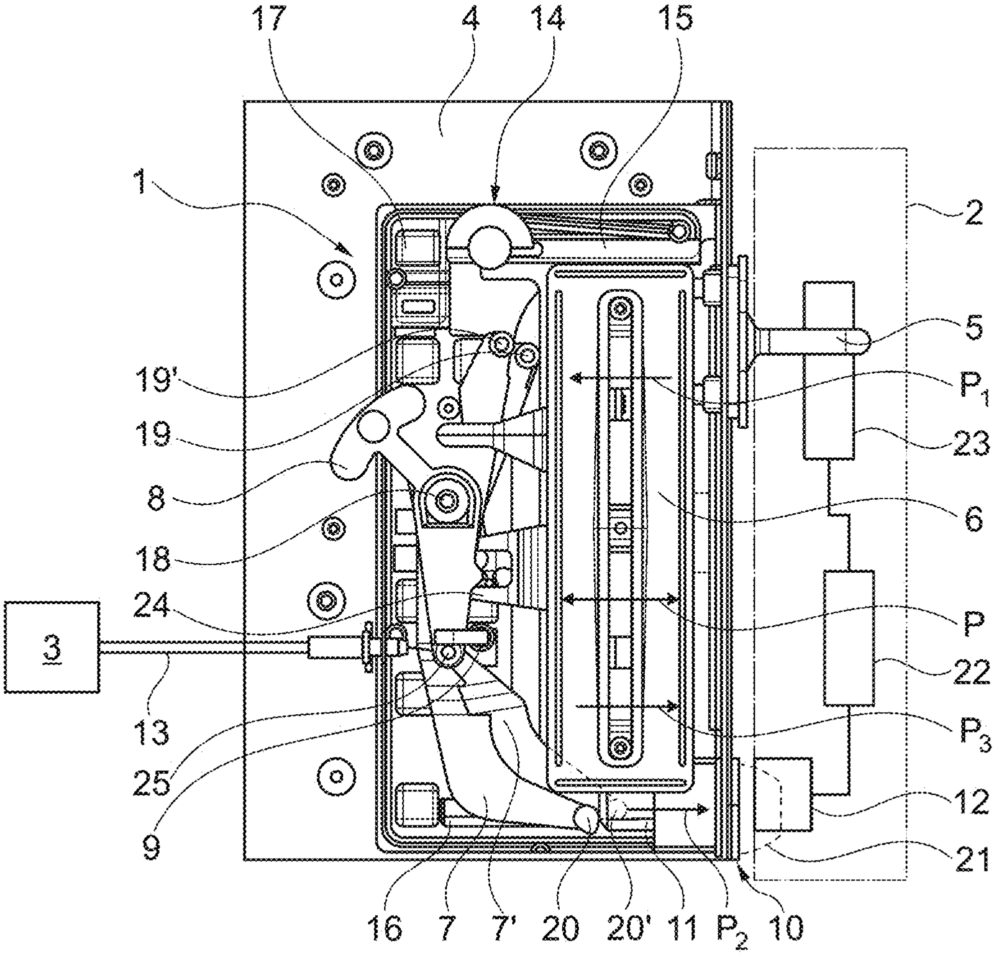
FIG. 1 shows a side view of an actuating system for a door lock, in particular a sliding door lock, in the installed state on a sliding door.

FIG. 1 shows an actuating system 1 for a motor vehicle lock 2 and here in particular a motor vehicle sliding door lock, as well as for actuating a door holding lock 3. The actuating system 1 visualizes a position of the actuating system 1 in which the sliding door 4 is in a closed position. In other words, the sliding door 4 is held in the closed position by means of the door lock 2 or by the engagement of the door lock 2 in a lock holder 5. Therefore, the door lock 2 is in a locked position, whereas the door holding lock 3 is in an unlocked position. A door lock 2, 3 is said to be in a locked position if a locking mechanism is in a latched position. For this purpose, a rotary latch engages with a pawl so that the rotary latch is prevented from releasing the lock holder 5.

The actuating system 1 comprises a handle 6, a deflection lever 7, an unlocking lever 8, a locking pin 9, a release mechanism 10 with an actuating bolt 11 and a switching means 12, a Bowden cable 13, a blockade mechanism 14 and the guide rails 15, 16. The individual parts of the actuating system 1 and their functions are explained in more detail below.

Figure 2:
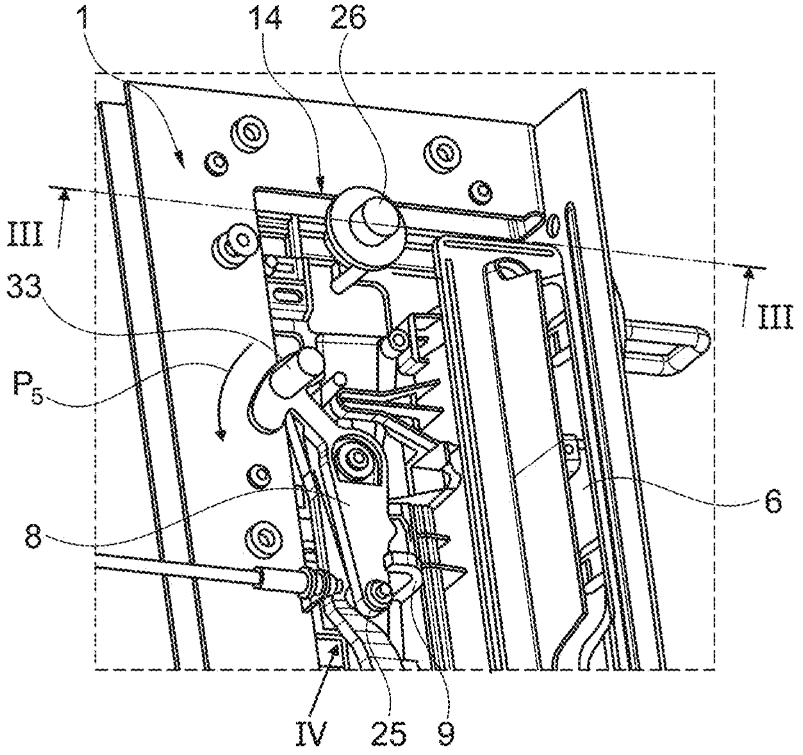
FIG. 2 shows a three-dimensional view of the actuating system shown in FIG. 1.
Figure 3:
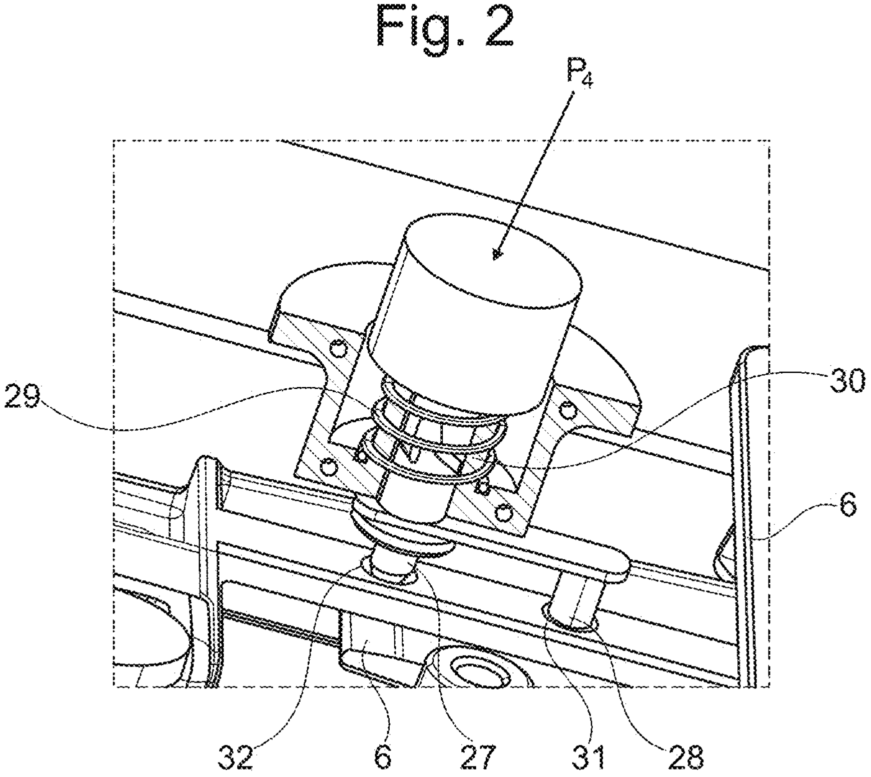
FIG. 3 shows a detailed view of the blockade mechanism in a partial sectional view along line III-III from FIG. 2.

The handle 6 is accommodated in a housing 17 via the guide rails 15, 16 in the direction of arrow P and movable to the left and right according to FIG. 1. As already explained at the beginning, the actuating system 1 is in an unactuated state, wherein the motor vehicle lock 2 is in a locked position, preferably a main latching position, so that the sliding door 4 is closed. To open the sliding door 4, the handle 6 must be moved manually in the direction of arrow P1, i.e. to the left in FIG. 1. In this respect, FIGS. 1 and 2 show the manual actuation of the sliding door 2.

By actuating the handle 6 in the direction of arrow P1 and along the rails 15, 16 of the housing 17, the deflection lever 7 is pivoted about an axis 18. In this respect, FIG. 1 shows two positions of the deflection lever 7. In a first position and the initial position of the deflection lever 7, a bolt-like extension 19 is in contact with the handle 6 and is moved into the position 19' by the handle 6. FIG. 1 thus shows the non-actuated position of the deflection lever 7 as well as the actuated position of the deflection lever 7'. By actuating the deflection lever 7, a further bolt-like extension 20 engages with the actuating bolt 11 and moves the actuating bolt 11 out of the sliding door 4. The position of the bolt-like extension 20' is shown in dashed form in FIG. 1.

By actuating the actuating bolt 11, the actuating bolt is moved out of the sliding door 4, wherein the position of the actuating bolt 11 or a free end 21 of the actuating bolt 11 is shown in dashed form 21 as a free end 21. By moving the actuating bolt 11, the free end 21 comes into contact with the switching means 12. The switching means 12 is in turn able to control an electric drive 22 in the interior of the motor vehicle lock 2 or a control unit 22 so that a locking mechanism 23 in the interior of the motor vehicle lock 2 can be unlocked. Therefore, the movement of the handle, the deflection lever 7 and the actuating bolt 11 results in the opening or unlocking of the locking mechanism 23. The lock holder 5 is released so that the door element 4 can be moved manually, for example using the handle 6.

If the sliding door 4 reaches an end position, the door holding lock 3 engages with, for example, a locking bolt or lock holder (not shown) and holds the sliding door 4 in the open position. In the open position, the handle 6 can then move back to the initial position shown in FIG. 1 via a corresponding spring pretensioning. In other words, the spring-loaded handle 6 is moved to the right against the direction of arrow P1 in FIG. 1. The door element 4 is now in an open and secured position, wherein the door element 4 is held securely in position by the door holding lock 3.

To manually move the door back into the closed position, the handle 6 is moved in the direction of arrow P3, i.e. to the right in FIG. 1, whereby an extension 24 engages with the unlocking lever 8 or moves the unlocking lever directly. The unlocking lever 8 is also pivotably accommodated in the actuating system about the axis 18 and is capable of being pivoted counterclockwise about the axis 18. By moving the handle 6 in the direction of arrow P3, the unlocking lever 8 pivots counter-clockwise, wherein the Bowden cable 13 is actuated, and the door holding lock 3 is unlocked in the usual way. For this purpose, the Bowden cable 13 is hooked into the unlocking lever 8 at a lower end, for example by means of a Bowden cable nipple. Thus, actuating the handle 6 can manually unlock the door holding lock 3. The door element 4 is released so that the operator can move the door 4 using the handle 6, for example, until the lock holder 5 reengages with the locking mechanism 23, and the door element 4 is back in the closed position.

According to the invention, the actuating system can be used as a manual actuating system for the sliding door 4, as well as an electrically assisted actuating system.

The conversion of the actuating system from manual actuation as described in FIG. 1 to an electric actuating system is described below.

FIG. 2 shows the actuating system 1 in a three-dimensional representation. FIG. 2 shows the initial position of the handle 6 as shown in FIG. 1. For conversion, two settings must be made independently of one another on the actuating system 1. The blockade mechanism 14 comprises a displaceably mounted blocking pin 26, wherein blocking latches 27, 28 are arranged on the blocking pin. For conversion, the locking pin 26 must be pressed in the direction of arrow P4. A sliding guide 29 is provided on the blocking pin 26 which enables holding the blocking pin 26 in a depressed position after it has been actuated once. For this purpose, the blocking pin 26 is held in the pressed-in position by means of a compression spring 30 in the sliding guide 29. By way of explanation, if the blocking pin 26 is actuated again, the sliding guide 29 in combination with the compression spring 13 enables the blocking pin 26 to be moved out of the actuated position again. In the pressed position, i.e. in the pressed-in position of the blocking pin 26, the blocking latches 27, 28 engage with the handle 6 through the openings 31, 32 and thus enable the blocking of the handle 6. The locking or blocking latches 27, 28 thus prevent movement of the handle in the sense of manual actuation in accordance with the explanations to FIG. 1.

For further conversion of the actuating system 1, the unlocking lever must be moved in the direction of arrow P5 until the lower end 25 engages with the locking pin 9. The interaction of the unlocking lever 8 with the locking pin 9 is shown in detail in FIGS. 4 and 5.

Figure 4:
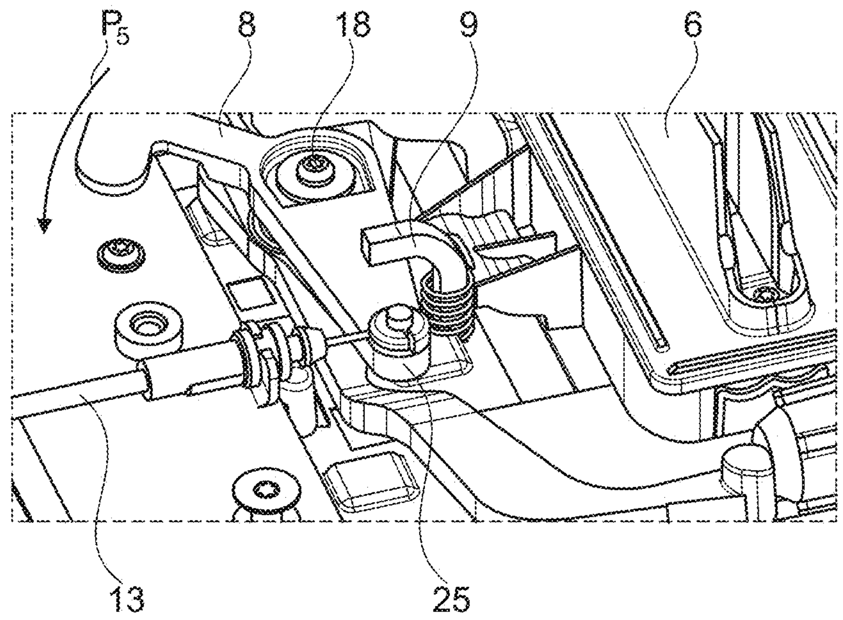
FIG. 4 shows a detailed view of the locking pin as seen from arrow IV from FIG. 2, wherein the actuating lever for the door holding lock is shown in a release position.
Figure 5:
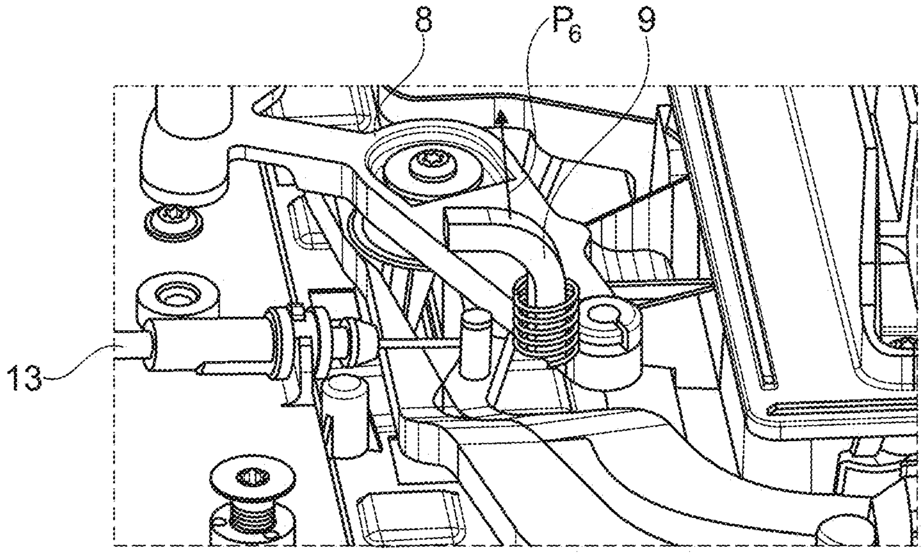
FIG. 5 shows a view of the locking pin in a locking position of the actuating lever for the door holding lock.

FIG. 4 shows the initial position of the unlocking lever 8. In other words, the lower end 25 of the unlocking lever 8 is located in front of the locking pin 9. If the unlocking lever 8 is now moved in the direction of arrow P5, the unlocking lever 8 moves behind the locking pin 9, as shown in FIG. 5. The locking pin 9 holds the unlocking lever 8 in the position shown in FIG. 5 and at the same time actuates the door holding lock via the Bowden cable. In other words, the door holding lock is held in the unlocked position. Thus, the door holding lock 3 is always in an unlocked, i.e. open, position. By actuating the blocking pin 26 and snapping in the blocking latches 27, 28 in the handle 6 and locking the unlocking lever 8, the actuating system can be electrically actuated in combination with the motor vehicle lock.

If the actuating system is in the electrically controllable state according to FIG. 5 and the blocking pin 26 is pressed in, an operator can control the electric drive and unlock the locking mechanism 23, for example by means of a radio remote control. An electric motor drive of the door element 4 is then able to move the sliding door and hold it in the open position by means of the electric drive. In this state, the handle 6 can only be used for entering and exiting or can be moved in the event of emergency actuation, i.e. without an electric motor drive.

If the actuating system 1 is now to be returned to the manual operating state, the blocking pin 26 must be actuated again, wherein the blocking pin and thus the blocking latches 27, 28 move in a direction opposite to that shown by arrow P4 and release the handle 6. At the same time, the locking pin 9 must be pulled out of engagement with the unlocking lever 8 in the direction of arrow P6 so that the unlocking lever 8 is released, and the door holding lock 6 can be locked again.

Overall, the structure according to the invention of the actuating system 1 can be equipped with a system, both a manual and an electrically actuated sliding door 4. This also demonstrates an advantage of electrically actuated doors, specifically that in the event of a power failure, it is possible to actuate the actuating system 1 completely manually.

LIST OF REFERENCE SIGNS

1 Actuating system
2 Motor vehicle lock
3 Door holding lock
4 Sliding door
5 Lock holder
6 Handle
7 Deflection lever
8 Unlocking lever
9 Locking pin
10 Release mechanism
11 Actuating bolt
12 Switching means
13 Bowden cable
14 Blockade mechanism
15, 16 Guide rails
17 Housing
18 Axis
19, 19', 20, 20' Bolt-like extension
21 Free end
22 Electric drive, control unit
23 Ratchet mechanism
24 Extension
25 Lower end
26 Blocking pin
27, 28 Blocking latch
29 Sliding guide
30 Compression spring
31, 32 Opening
33 Cylindrical pin
P, P1, P2, P3, P4, P5, P6 Arrow

The invention claimed is:

1. An actuating assembly for a door element displaceably accommodated in a motor vehicle, the actuating assembly comprising:

a door lock for locking the door element in a closed position, a door holding lock for holding the door element in an open position, a linearly movable handle, a blocking mechanism for the handle, wherein the blocking mechanism is movable between a first state for manually actuating the door element by linearly moving the handle and a second state for blocking linear movement of the handle, wherein the door lock is unlocked by actuating the handle in a first direction, and the door holding lock is unlocked by actuating the handle in an opposite direction relative to the first direction, wherein the handle of the actuating assembly is configured to be held by the blocking mechanism for electrically actuating the door lock and the door holding lock, an unlocking lever provided for unlocking the door holding lock, and a locking device provided for fixing a position of the unlocking lever.

2. The actuating assembly according to claim 1, wherein the blocking mechanism comprises at least one blocking pin.

3. The actuating assembly according to claim 2, further comprising a sliding guide, wherein the blocking pin is positioned by the sliding guide.

4. The actuating assembly according to claim 2, wherein the blocking mechanism has at least one blocking latch, and the blocking latch is actuated by the blocking pin.

5. The actuating assembly according to claim 1, wherein the locking device comprises a locking pin.

6. The actuating assembly according to claim 5, wherein the locking pin is configured to be actuated manually.

7. The actuating assembly according to claim 1, wherein the unlocking lever is configured to be actuated manually.

8. A method for holding a handle of an actuating assembly according to claim 1, the method comprising the steps of:

holding the handle by actuating the blocking mechanism, and unlocking the door holding lock by manually pivoting the unlocking lever so that the handle is fixed and the door holding lock is put out of operation.

9. The actuating assembly according to claim 2, wherein the at least one blocking pin is a linearly displaceably arranged blocking pin.

10. The actuating assembly according to claim 3, further comprising a spring element, wherein the sliding guide interacts with the spring element.

11. The actuating assembly according to claim 5, wherein the locking pin is spring-loaded.

12. The actuating assembly according to claim 7, further comprising an engagement means for manually actuating the unlocking lever by pivoting an engagement means.

13. The actuating assembly according to claim 12, wherein the engagement means comprises a cylindrical extension that protrudes from the door element and that is manually reachable by an operator.

14. An actuating assembly for a door element displaceably accommodated in a motor vehicle, the actuating assembly comprising:

a door lock for locking the door element in a closed position, a door holding lock for holding the door element in an open position, a linearly movable handle, a blocking mechanism for the handle, wherein the blocking mechanism is movable between a first state for manually actuating the door element by linearly moving the handle and a second state for blocking linear movement of the handle, wherein the door lock is unlocked by actuating the handle in a first direction, and the door holding lock is unlocked by actuating the handle in an opposite direction relative to the first direction, wherein the handle of the actuating assembly is configured to be held by the blocking mechanism for electrically actuating the door lock and the door holding lock, wherein the blocking mechanism comprises at least one blocking pin, a sliding guide, wherein the blocking pin is positioned by the sliding guide, and a spring element, wherein the sliding guide interacts with the spring element.

* * * * *